(12) United States Patent
Sultan et al.

(10) Patent No.: US 8,149,837 B2
(45) Date of Patent: Apr. 3, 2012

(54) METHOD OF SUPPORTING AN OPEN PROVIDER BACKBONE NETWORK

(75) Inventors: Robert Sultan, Somers, NY (US); Lucy Yong, Tulsa, OK (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 682 days.

(21) Appl. No.: 11/873,560

(22) Filed: Oct. 17, 2007

(65) Prior Publication Data

US 2008/0170583 A1 Jul. 17, 2008

Related U.S. Application Data

(60) Provisional application No. 60/885,168, filed on Jan. 16, 2007.

(51) Int. Cl.
*H04L 12/56* (2006.01)
(52) U.S. Cl. ........ 370/392; 370/409; 370/535; 709/238; 709/249
(58) Field of Classification Search ........................ None
See application file for complete search history.

(56) References Cited

U.S. PATENT DOCUMENTS

| | | |
|---|---|---|
| 5,844,890 A | 12/1998 | Delp et al. |
| 5,959,990 A | 9/1999 | Frantz et al. |
| 6,169,739 B1 | 1/2001 | Isoyama |
| 6,563,832 B1 | 5/2003 | Stuart et al. |
| 7,388,869 B2 | 6/2008 | Butehorn et al. |
| 7,460,542 B2 | 12/2008 | Bhatia |
| 2002/0034962 A1 | 3/2002 | Yokoyama |
| 2002/0085579 A1 | 7/2002 | Sullivan et al. |
| 2002/0146026 A1 | 10/2002 | Unitt et al. |
| 2003/0131131 A1 | 7/2003 | Yamada et al. |
| 2003/0172188 A1 | 9/2003 | Hasegawa et al. |
| 2004/0001485 A1 | 1/2004 | Frick et al. |
| 2004/0037279 A1 | 2/2004 | Zelig et al. |

(Continued)

FOREIGN PATENT DOCUMENTS

CN 1194522 A 9/1998
(Continued)

OTHER PUBLICATIONS

LAN/MAN Standards Committee of the IEEE Computer Society, "IEEE Standard for Local and metropolitan area networks: Virtual Bridged Local Area Networks—Amendment 4: Provider Bridges," IEEE Std 802.1ad™—2005, May 26, 2006, 74 pgs. (Front cover (2); i-xii; 1-60).

(Continued)

*Primary Examiner* — Ian N Moore
*Assistant Examiner* — Brian Roberts
(74) *Attorney, Agent, or Firm* — Conley Rose, P.C.; Grant Rodolph

(57) ABSTRACT

An apparatus comprising a first interface configured to transmit or receive backbone traffic, a second interface configured to transmit or receive non-backbone traffic, and a third interface in communication with the first interface and second interface, the third interface configured to multiplex or demultiplex the backbone traffic and the non-backbone traffic is disclosed, wherein the backbone traffic is traffic that will be, is, or has been B-tagged. Also disclosed is a node comprising a processor configured to implement a method comprising receiving a first data stream comprising backbone traffic, receiving a second data stream comprising non-backbone traffic, and multiplexing the first data stream with the second data stream.

20 Claims, 10 Drawing Sheets

U.S. PATENT DOCUMENTS

| | | | |
|---|---|---|---|
| 2004/0057469 A1* | 3/2004 | Nuss et al. | 370/535 |
| 2004/0153573 A1 | 8/2004 | Kim et al. | |
| 2004/0156345 A1 | 8/2004 | Steer et al. | |
| 2004/0208570 A1 | 10/2004 | Reader | |
| 2004/0213167 A1 | 10/2004 | Garcia-Luna-Aceves et al. | |
| 2004/0264505 A1 | 12/2004 | Miki et al. | |
| 2005/0220105 A1 | 10/2005 | Yen et al. | |
| 2005/0265308 A1 | 12/2005 | Barbir et al. | |
| 2005/0286541 A1* | 12/2005 | Bottorff et al. | 370/401 |
| 2006/0002370 A1 | 1/2006 | Rabie et al. | |
| 2006/0126616 A1 | 6/2006 | Bhatia | |
| 2006/0159008 A1 | 7/2006 | Sridhar et al. | |
| 2006/0198396 A1 | 9/2006 | Chang et al. | |
| 2007/0094362 A1 | 4/2007 | Li | |
| 2007/0098006 A1* | 5/2007 | Parry et al. | 370/437 |
| 2007/0177597 A1 | 8/2007 | Ju | |
| 2007/0268832 A1 | 11/2007 | Soon et al. | |
| 2008/0037559 A1 | 2/2008 | Eriksson | |
| 2009/0109848 A1* | 4/2009 | Hato et al. | 370/235 |

FOREIGN PATENT DOCUMENTS

| | | |
|---|---|---|
| CN | 1474564 A | 2/2004 |
| CN | 1486030 A | 3/2004 |
| CN | 1722734 A | 1/2006 |
| CN | 1791067 A | 6/2006 |
| CN | 1292567 | 12/2006 |
| EP | 1244254 A2 | 9/2002 |
| EP | 1670187 A1 | 6/2006 |
| EP | 1705840 A | 9/2006 |
| JP | 2005012484 A | 1/2005 |
| WO | 03/079614 A1 | 9/2003 |
| WO | 2005099183 | 10/2005 |
| WO | 2006002230 A2 | 1/2006 |

OTHER PUBLICATIONS

LAN/MAN Standards Committee of the IEEE Computer Society and Interworking Task Group of IEEE 802.1, "Draft Standard for Local and metropolitan area networks—Virtual Bridged Local Area Networks—Amendment 6: Provider Backbone Bridges," IEEE P802.1ah/D3.01, Sep. 8, 2006, 70 pgs. (Front cover; 2-70).

LAN/MAN Standards Committee of the IEEE Computer Society and Interworking Task Group of IEEE 802.1, "Draft Standard for Local and metropolitan area networks—Virtual Bridged Local Area Networks—Amendment 6: Provider Backbone Bridges," IEEE P802.1ah/D3.01, Sep. 8, 2006, 81 pgs. (71-151).

LAN/MAN Standards Committee of the IEEE Computer Society and Interworking Task Group of IEEE 802.1, "Draft Standard for Local and metropolitan area networks—Virtual Bridged Local Area Networks—Amendment 6: Provider Backbone Bridges," IEEE P802.1ah/D3.4, Mar. 10, 2007, 98 pgs. (Front cover; 2-98).

LAN/MAN Standards Committee of the IEEE Computer Society and Interworking Task Group of IEEE 802.1, "Draft Standard for Local and metropolitan area networks—Virtual Bridged Local Area Networks—Amendment 6: Provider Backbone Bridges," IEEE P802.1ah/D3.4, Mar. 10, 2007, 97 pgs. (99-195).

LAN/MAN Standards Committee of the IEEE Computer Society and Interworking Task Group of IEEE 802.1, "Draft Standard for Local and metropolitan area networks—Virtual Bridged Local Area Networks—Amendment 6: Provider Backbone Bridges," IEEE P802.1ah/D3.6, Jun. 21, 2007, 111 pgs. (Front cover; 2-111).

LAN/MAN Standards Committee of the IEEE Computer Society and Interworking Task Group of IEEE 802.1, "Draft Standard for Local and metropolitan area networks—Virtual Bridged Local Area Networks—Amendment 6: Provider Backbone Bridges," IEEE P802.1ah/D3.7, Aug. 15, 2007, 116 pgs. (Front cover; 2-116).

Sultan, Robert, et al.; "Method of Preventing Transport Leaks in Hybrid Switching Networks"; U.S. Appl. No. 11/691,556, filed Mar. 27, 2007; Specification 38 pgs.; 9 Drawing Sheets (Figs. 1A-10).

Sultan, Robert, et al.; "Method of Detecting Transport Leaks in Hybrid Switching Networks"; U.S. Appl. No. 11/691,558, filed Mar. 27, 2007; Specification 38 pgs.; 9 Drawing Sheets (Figs. 1A-10).

Foreign Communication From a Related Counterpart Application—International Search Report and Written Opinion, PCT/CN2007/071172, Mar. 20, 2008, 15 pages.

IEEE P802.1ah/D3.3, "Virtual Bridged Local Area Networks—Amendment 6: Provider Backbone Bridges," Dec. 13, 2006, 195 pgs.

Wei Cao, et al., et al. "IEEE 802.1ah Mode for Ethernet Over MPLS", draft-cao-pwe3-802-1ah-00.txt, Oct. 16, 2006.

Bottorff, Paul, "General Discussion of Provider Backbone Transport in 802.1ah Networks," May 10, 2006, 4 pgs.

Bottorff, Paul, et al., "Business Made Simple Provider Backbone Transport," Nortel, Jul. 2006, 12 pgs.

Maarten Vissers, "Ethernet Transport Interfaces 1.5Mbit/s to 10Tbit/s," IEEE 802 LAN/MAN Standards Committee, URL: http://www.ieee802.org/1/files/public/docs2006/ah-vissers-802.1-pb-pbb-models-1006.ppt; Oct. 3, 2006; 4 pages.

Foreign Communication From a Related Counterpart Application—International Search Report and Written Opinion, PCT/CN2007/071355, Apr. 3, 2008, 9 pages.

Foreign Communication From a Related Counterpart Application—International Search Report and Written Opinion, PCT/CN2007/071354, Apr. 10, 2008, 10 pages.

Foreign Communication From a Related Counterpart Application—Supplementary European Search Report, EP application No. 07846181, Aug. 24, 2009, 3 pages.

Foreign Communication From a Related Counterpart Application—Supplementary European Search Report, EP application No. 07846021.9, Dec. 3, 2009, 12 pages.

Office Action dated Apr. 15, 2009, U.S. Appl. No. 11/691,556, filed on Mar. 27, 2007, 25 pages.

Office Action dated Oct. 28, 2009, U.S. Appl. No. 11/691,556—21 pages.

Office Action dated Apr. 16, 2009, U.S. Appl. No. 11/691,558, filed on Mar. 27, 2007, 21 pages.

Office Action dated Nov. 3, 2009, U.S. Appl. No. 11/691,558—13 pages.

Foreign Communication from a Related Counterpart Application—Chinese application 200780034463.8—Office Action dated Aug. 5, 2010, 3 pages.

Foreign Communication From a Related Counterpart Application—Supplementary European Search Report, EP application No. 07846180, Aug. 24, 2009, 5 pages.

Office Action dated Mar. 3, 2010, U.S. Appl. No. 11/691,556—19 pages.

Office Action dated Aug. 17, 2010, U.S. Appl. No. 11/691,556—20 pages.

* cited by examiner

| B-DA | B-SA | TPID | B-VID | Other Header Data | L/T | Payload | FCS |
|---|---|---|---|---|---|---|---|
| 6 Bytes | 6 Bytes | 2 Bytes | 2 Bytes | 24 Bytes | 2 Bytes | 46-1500 Bytes | 4 Bytes |

METHOD OF SUPPORTING AN OPEN PROVIDER BACKBONE NETWORK

CROSS-REFERENCE TO RELATED APPLICATIONS

The present application claims priority to U.S. Provisional Patent Application Ser. No. 60/885,168 filed Jan. 16, 2007 by Yong et al. and entitled "Method of Multiplexing Parallel S and B Interfaces of a Backbone Edge Bridge on a Single Interface," which is incorporated herein by reference as if reproduced in its entirety. The present application includes subject matter related to U.S. patent application Ser. No. 11/691,556 filed Mar. 27, 2007 by Sultan et al. and entitled "Method of Preventing Transport Leaks in Hybrid Switching Networks," and U.S. patent application Ser. No. 11/691,558 filed Mar. 27, 2007 by Sultan et al. and entitled "Method of Detecting Transport Leaks in Hybrid Switching Networks" which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through the network. The nodes may include routers, switches, and/or bridges that transport the individual data frames and/or packets through the network. A service provider may offer data transport services to customers to promote linking of otherwise disparate and segregated LANs. Virtual Local Area Networks (VLANs) may use a VLAN identifier (VID) to associate data frames together.

One type of network is a provider bridged network (PBN). A PBN may transport data between a customer and a communication network. PBNs may comply with an IEEE 802.1ad standard and may employ a 12-bit VID. A PBN may comprise provider edge bridges (PEBs) at the edges of the network and provider bridges (PBs) in the core of the network. A PBN may also comprise other communication nodes.

Another type of network is a provider backbone bridge network (PBBN). A PBBN may be a core network that transports data between PBNs. PBBNs may comply with an IEEE 802.1 ah standard and may employ a 24-bit Service Instance Identifier (ISID), thereby promoting a substantially larger pool of unique Service Instances than may be supported by the 12-bit VID associated with the PBNs. A PBBN may comprise provider backbone edge bridges (BEBs) and provider backbone core bridges (BCBs). PBBNs may provide an Ethernet-like mechanism for interconnecting PBNs, which structures the network hierarchically and promotes end-to-end bridged networks that support low cost, low configuration effort network solutions.

SUMMARY

In a first aspect, the disclosure includes an apparatus comprising a first interface configured to transmit or receive backbone traffic, a second interface configured to transmit or receive non-backbone traffic, and a third interface in communication with the first interface and second interface, the third interface configured to multiplex or demultiplex the backbone traffic and the non-backbone traffic, wherein the backbone traffic is traffic that will be, is, or has been B-tagged.

In a second aspect, the disclosure includes a node comprising a processor configured to implement a method comprising receiving a first data stream comprising backbone traffic, receiving a second data stream comprising non-backbone traffic, and multiplexing the first data stream with the second data stream.

In a third aspect, the disclosure includes a method comprising migrating a first PBN comprising a plurality of S-VLAN bridges to an open provider backbone network comprising a second PBN comprising some of the S-VLAN bridges and a PBBN comprising the remaining S-VLAN bridges, wherein at least one of the S-VLAN bridges at an edge of the PBBN is converted to a BEB and at least one of the S-VLAN bridges at the edge of the PBBN remains as a S-VLAN bridge.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a novel method for multiplexing both backbone traffic and non-backbone traffic over a common port. In an embodiment, an interface may be located on each of two network nodes, for example a BEB and a S-VLAN bridge, thereby allowing a single link to be deployed between the nodes instead of deploying a first link for a non-backbone traffic and a second link for backbone traffic. Specifically, the interface may multiplex traffic associated with parallel Provider Network Ports (PNPs) and Provider Backbone Ports (PBPs), and multiplex traffic associated with a parallel Customer Network Ports (CNPs) and Customer Instance Ports (CIPs). Such multiplexing allows backbone traffic and non-backbone traffic to be carried over the common link, thereby eliminating the need for the CIP and PBP. By combining backbone traffic and non-backbone traffic, the complexity of communications infrastructure construction and/or technology migration may be reduced. Reduced complexity of communications infrastructure construction and/or technology migration may promote accelerated deployment of new communications architectures and new communications services, for example the IEEE 802.1ah backbone network architecture.

Figure 1:
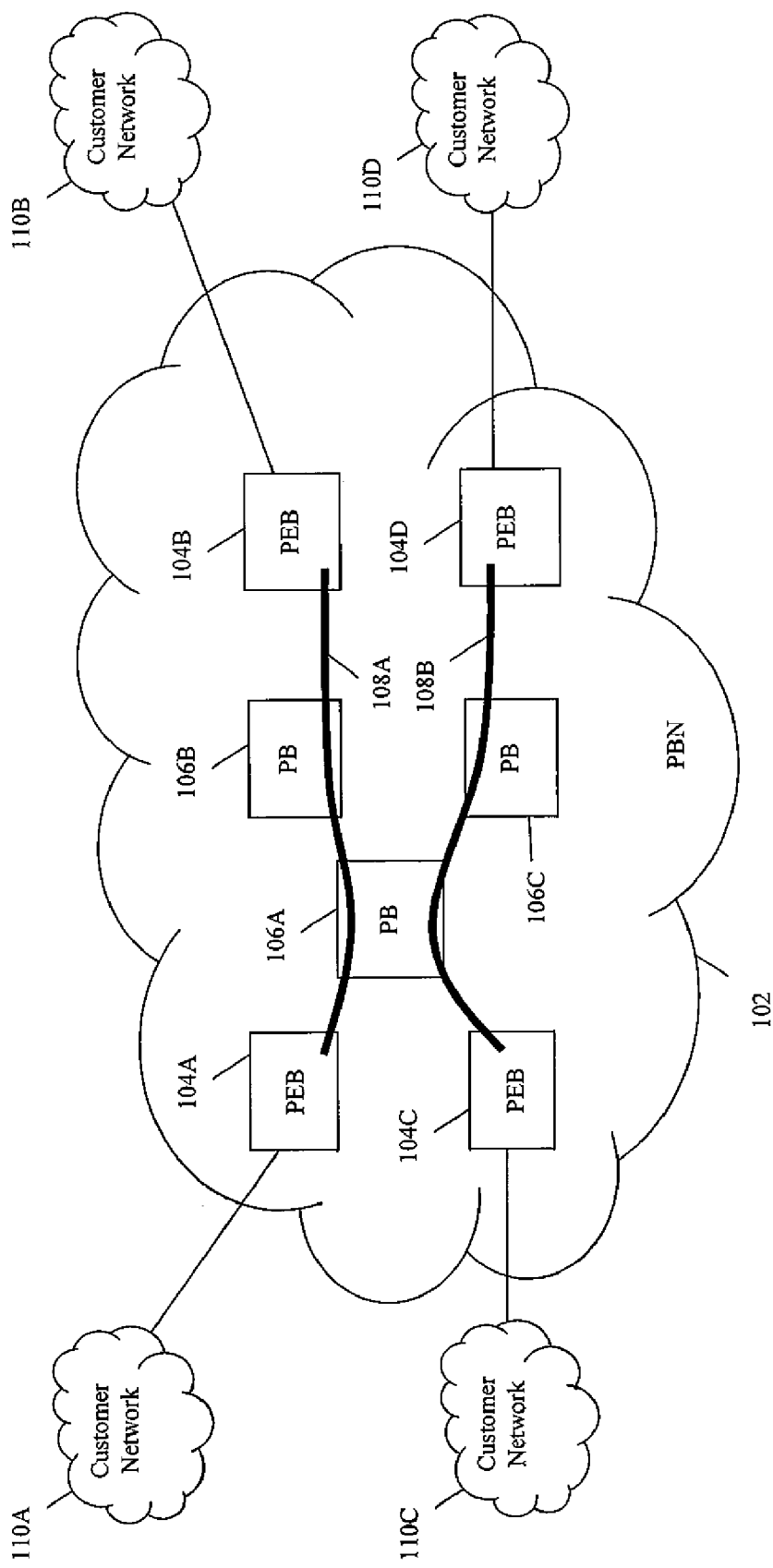
FIG. 1 is a schematic diagram of an embodiment of a PBN.

FIG. 1 illustrates a PBN 102 that supports an interconnection service for customer networks 110A, 110B, 110C, 110D. The PBN 102, which may be configured as defined in IEEE 802.1ad, comprises a plurality of PBs 106A, 106B, 106C and a plurality of PEBs 104A, 104B, 104C, 104D. PBs 106A, 106B, 106C may also be referred to as service provider VLAN (S-VLAN) bridges. Traffic associated with a particular customer is carried by S-VLANs 108A, 108B, which are sometimes called service instances. As explained below, such traffic contains an S-tag that associates the traffic with a particular S-VLAN 108A, 108B.

Figure 2:
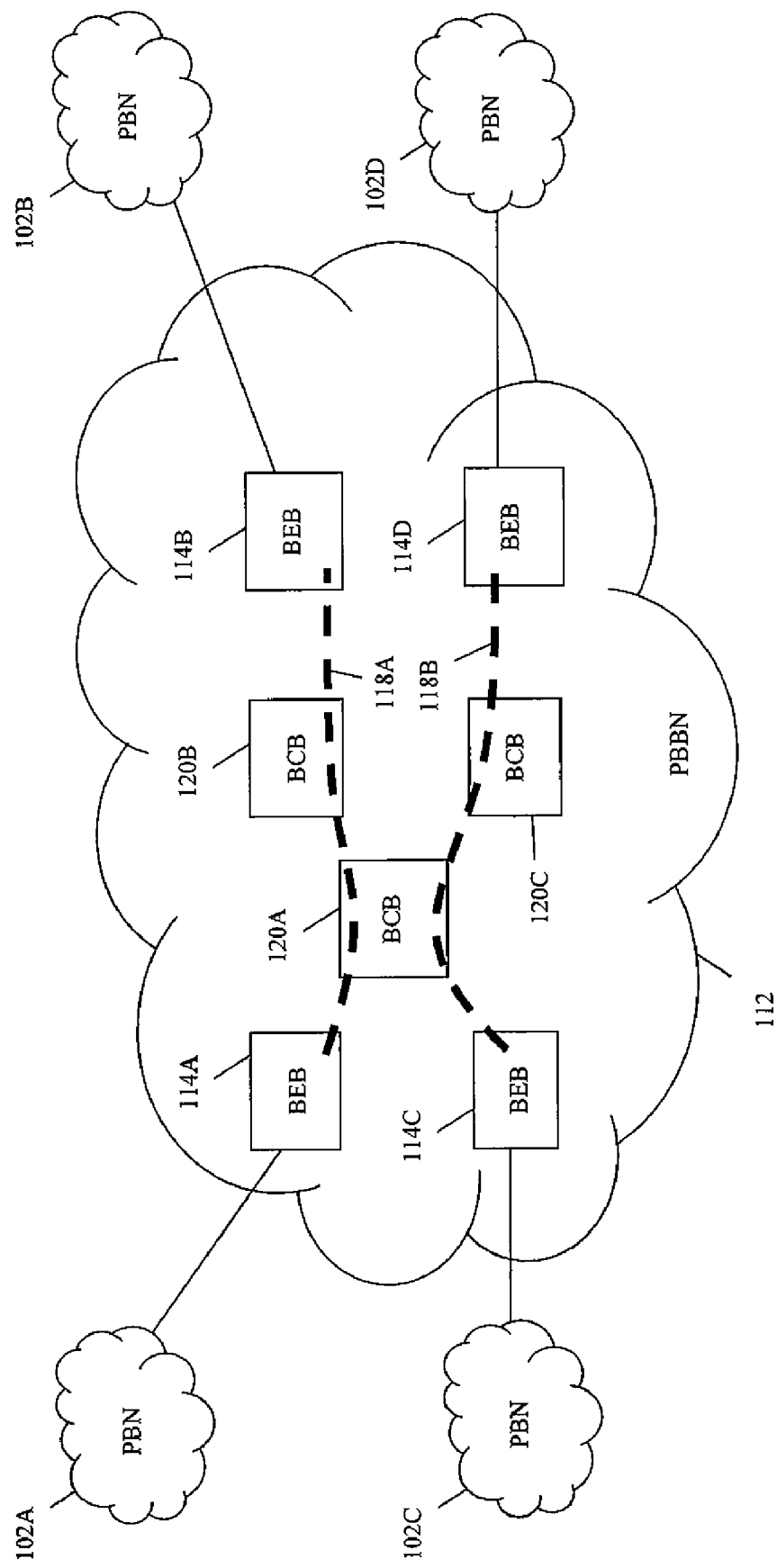
FIG. 2 is a schematic diagram of an embodiment of a PBBN.

FIG. 2 illustrates a PBBN 112 used to provide an interconnection service for PBNs 102A, 102B, 102C, 102D. The PBBN 112, which may be configured as defined in IEEE 802.1ah, contains BEBs 114A, 114B, 114C, 114D and BCBs 120A, 120B, 120C. Because the BCBs 120A, 120B, 120C are structurally similar to PBs 106A, 106B, 106C, the BCBs 120A, 120B, 120C may be referred to as S-VLANs bridges as well. A service instance transiting the PBBN 112 may be mapped to one of the backbone VLANs (B-VLANs) 118A, 118B (sometimes called backbone service instances), which has a larger identifier space than an S-VLAN 108A, 108B. Each such service instance is mapped to one of the Backbone VLANs (B-VLANs) 118A, 118B at the BEBs 114A, 114B, 114C, 114D. This method allows a large number of service instances to be supported by the PBBN 112. As explained below, traffic transiting the PBBN 112 may also be encapsulated with Backbone MAC Addresses (B-tagged) to reduce the number of MAC Addresses to which a BCB 120A, 120B, 120C must have visibility, and to isolate the PBBN 112 from sensitivity to customer MAC addresses. B-tagged traffic may still contain an S-tag, but the S-tag is not read by the nodes within the PBBN 112.

The PEBs 104, PBs 106, BEBs 114, and BCBs 120 described herein may generally be referred to as nodes, and may be implemented as general-purpose routers, bridges, or switches, which are discussed in detail below. The communication links between the nodes may be electrical, optical, wireless, or any other kind of communications link. In an embodiment, the PBN 102 and PBBN 112 may contain many more PEBs 104, PBs 106, BEBs 114, and BCBs 120 than are depicted in FIGS. 1 and 2. Additionally, in an embodiment, linkages among the PEBs 104, PBs 106, BEBs 114, and BCBs 120 may be different from those depicted in FIGS. 1 and 2.

Backbone traffic can be distinguished from non-backbone traffic based on its past, present, or future encapsulation. The term "backbone traffic" may refer to traffic that will be, is, or has been B-tagged within the PBBN 112. In an embodiment, backbone traffic that will be, is, or has been B-tagged may be transmitted or received by a CIP and/or a PBP. Specifically, S-tagged traffic carried by a CIP may not be B-tagged, but is still identified as backbone traffic because it will be B-tagged upon entry into the PBBN 112. Alternatively, S-tagged traffic carried by a CIP may not be B-tagged, but is still identified as backbone traffic because it was B-tagged while in the PBBN 112 and had the B-tag removed upon exit from the PBBN 112. In contrast, the term "non-backbone traffic" may refer to traffic that has not been, is not, and will not be B-tagged within the PBBN 112. In an embodiment, non-backbone traffic that has not, is not, and will not be B-tagged may be transmitted or received by a CNP and/or a PNP.

Figure 3:
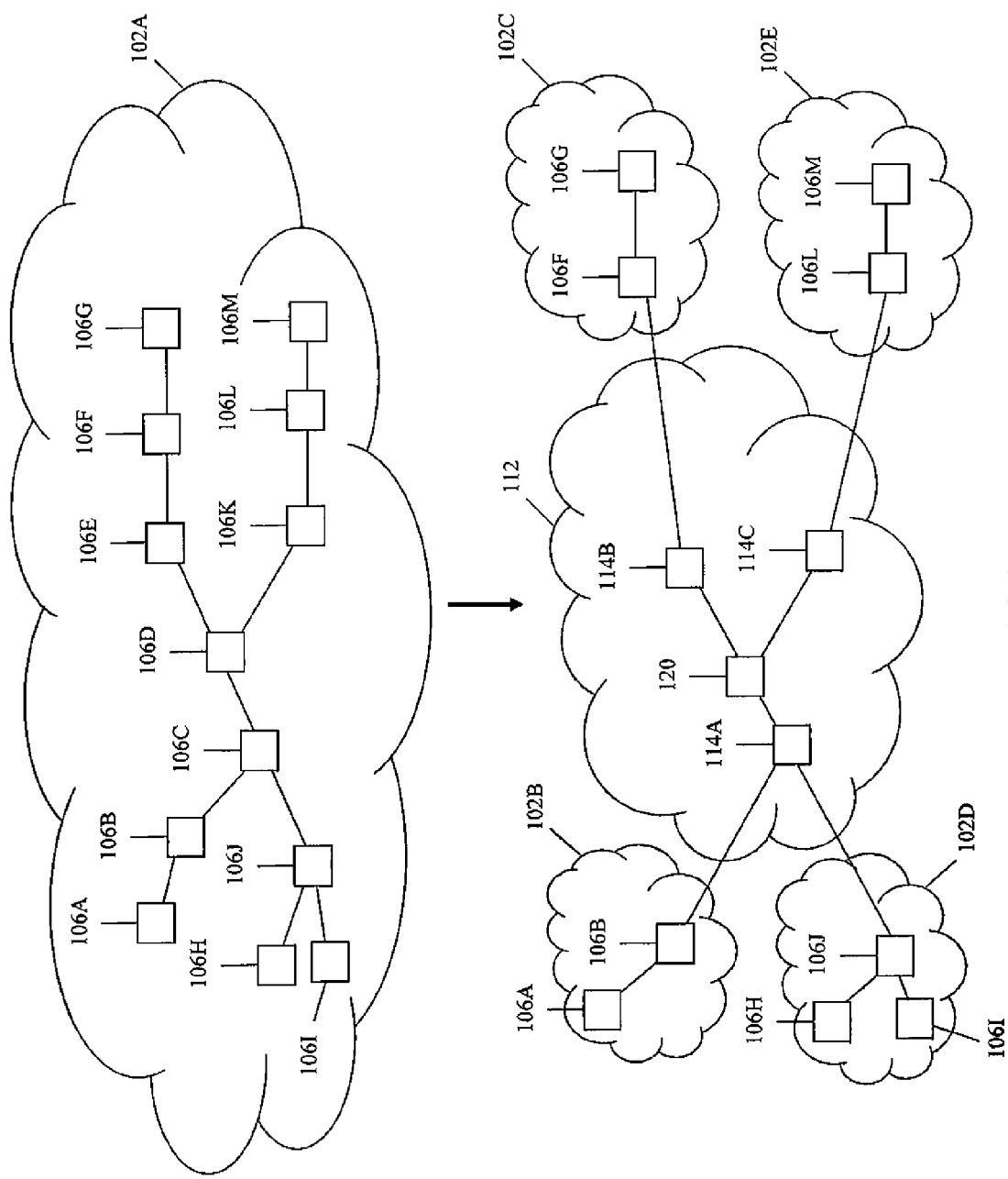
FIG. 3 is a schematic diagram of an embodiment of a migration of a PBN to an open provider backbone network.

FIG. 3 illustrates a PBN 102A comprising a plurality of PBs 106A, 106B, 106C, 106D, 106E, 106F, 106G, 106H, 106I, 106J, 106K, 106L, 106M. Sometimes it is desirable to partition the single PBN 102A into a plurality of smaller PBNs 102B, 102C, 102D, 102E interconnected across a single PBBN 112, particularly when the PBN 102A is relatively large. This allows the nodes within the core of the PBBN 112 to support a larger number of service instances than could be supported by the single PBN 102A. Because both the PBs 106 and the BCBs 120 are S-VLAN bridges, the migration may require only minimal or no modification to PB 106D for PB 106D to become BCB 120. However, this migration may require that the PBs 106C, 106E, 106K at the edge of the newly formed PBBN 112 be replaced by BEBs 114A, 114B, 114C.

Figure 4:
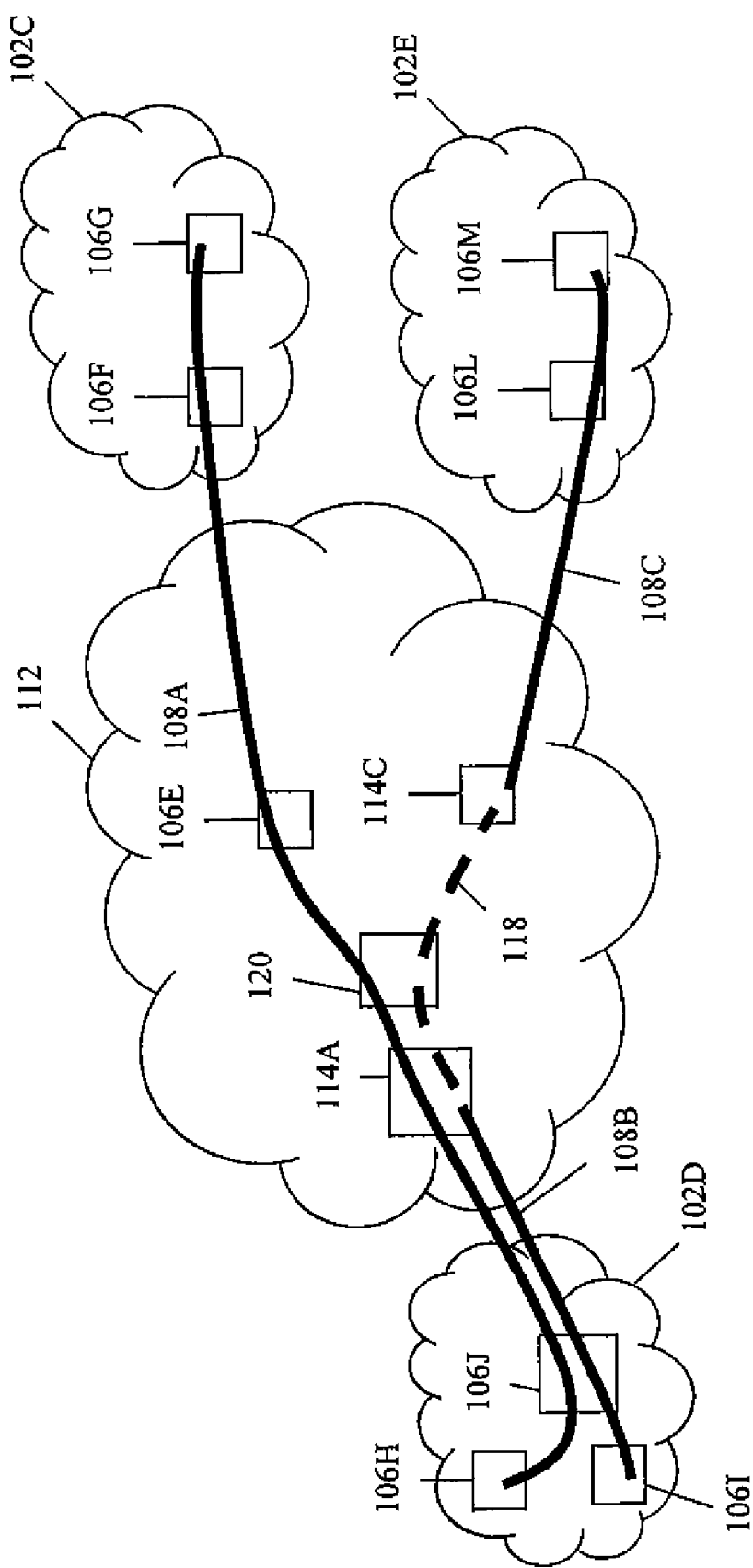
FIG. 4 is a schematic diagram of an embodiment of an open provider backbone network.

When the various nodes are upgraded, the changes are commonly made in increments. Specifically, FIG. 4 illustrates that PBs 106C, 106K have been replaced with BEBs 114A, 114C, but PB 106E remains. Such incremental implementation may reduce the time during which traffic is disrupted and avoid the expense of requiring technicians to be dispatched concurrently to multiple locations. The incremental implementation may also be necessitated by budgetary constraints. In many cases, the transition from PBs 106C, 106E, 106K to BEBs 114A, 114B, 114C is simplified because the BEBs 114A, 114B, 114C are required to perform all the functions of the S-VLAN bridges that they replace, e.g. PBs 106C, 106E, and 106K. Thus, when BEB 114A replaces PB 106C, BEB 114A can exchange B-tagged 318 traffic with BEB 114C and can concurrently exchange non-backbone-encapsulated S-VLAN (S-tagged) 108A traffic with PB 106E. As such, the PBBN 112 supports both PBN and PBBN traffic, and may be referred to as an Open Provider Backbone (OPB) network.

Figure 5:
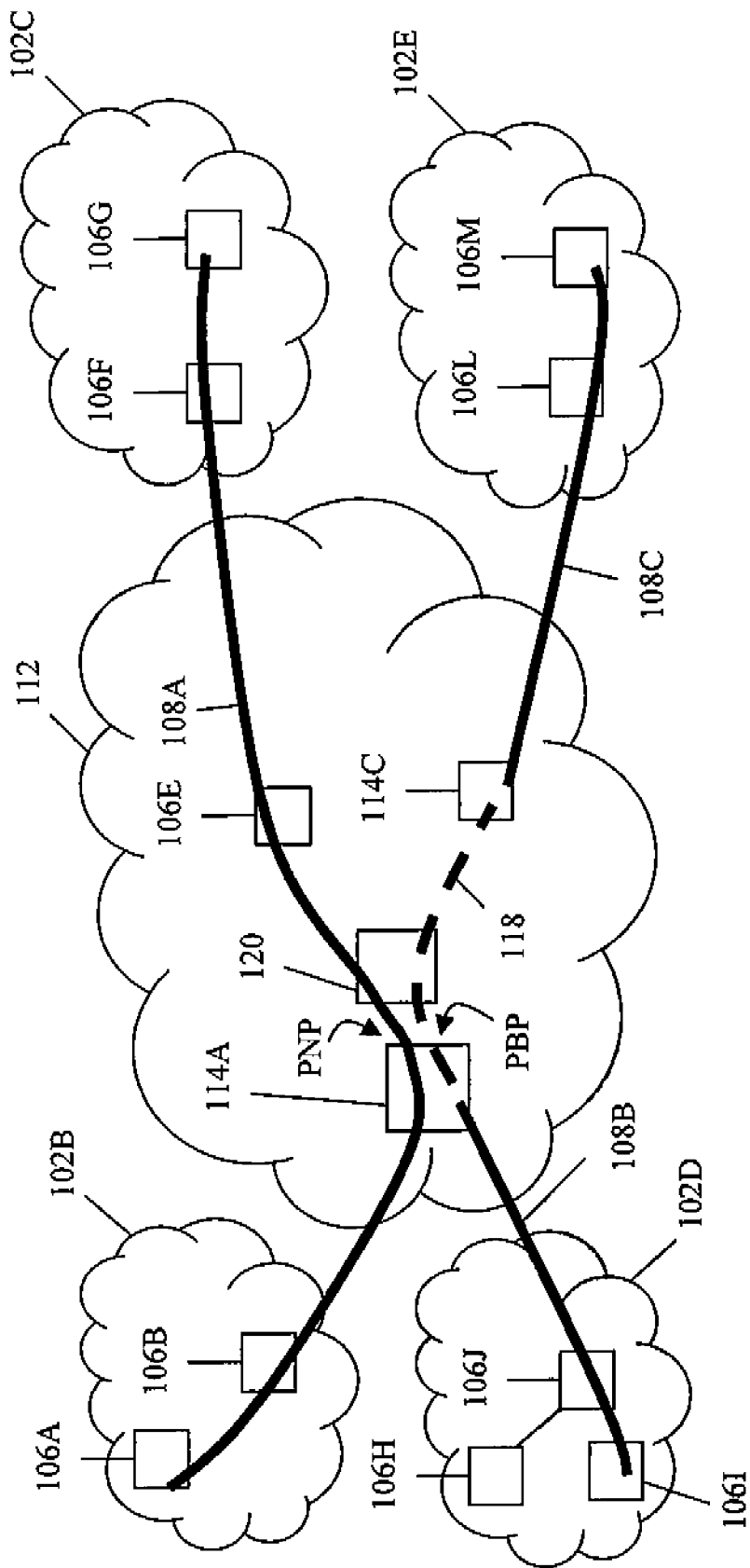
FIG. 5 is a schematic diagram of an embodiment of a provider network port in parallel with a provider backbone port.

FIG. 5 illustrates a specific implementation of the OPB network having parallel ports. IEEE 802.1ah drafts prior to D5.0 (Apr. 19, 2007) are specified such that an inefficiency exists when deploying an OPB in some topologies. These earlier drafts specified that S-tagged traffic, e.g. the S-VLAN 108A traffic carried between BEB 114A and BCB 120, be transmitted or received at BEB 114A by a PNP while B-tagged traffic 118, e.g. B-VLAN traffic carried between BEB 114A and BCB 120 is transmitted or received at BEB 114A by a PBP. Thus, two distinct ports may be required (each with a distinct VLAN identifier space) to communicate different types of traffic between the two bridging devices.

Multiple ports that originate at one bridge and provide connectivity to another single bridge may be referred to as "parallel ports." The requirement for parallel ports, rather than a single port, creates additional product complexity, maintenance, and cost.

Figure 6:
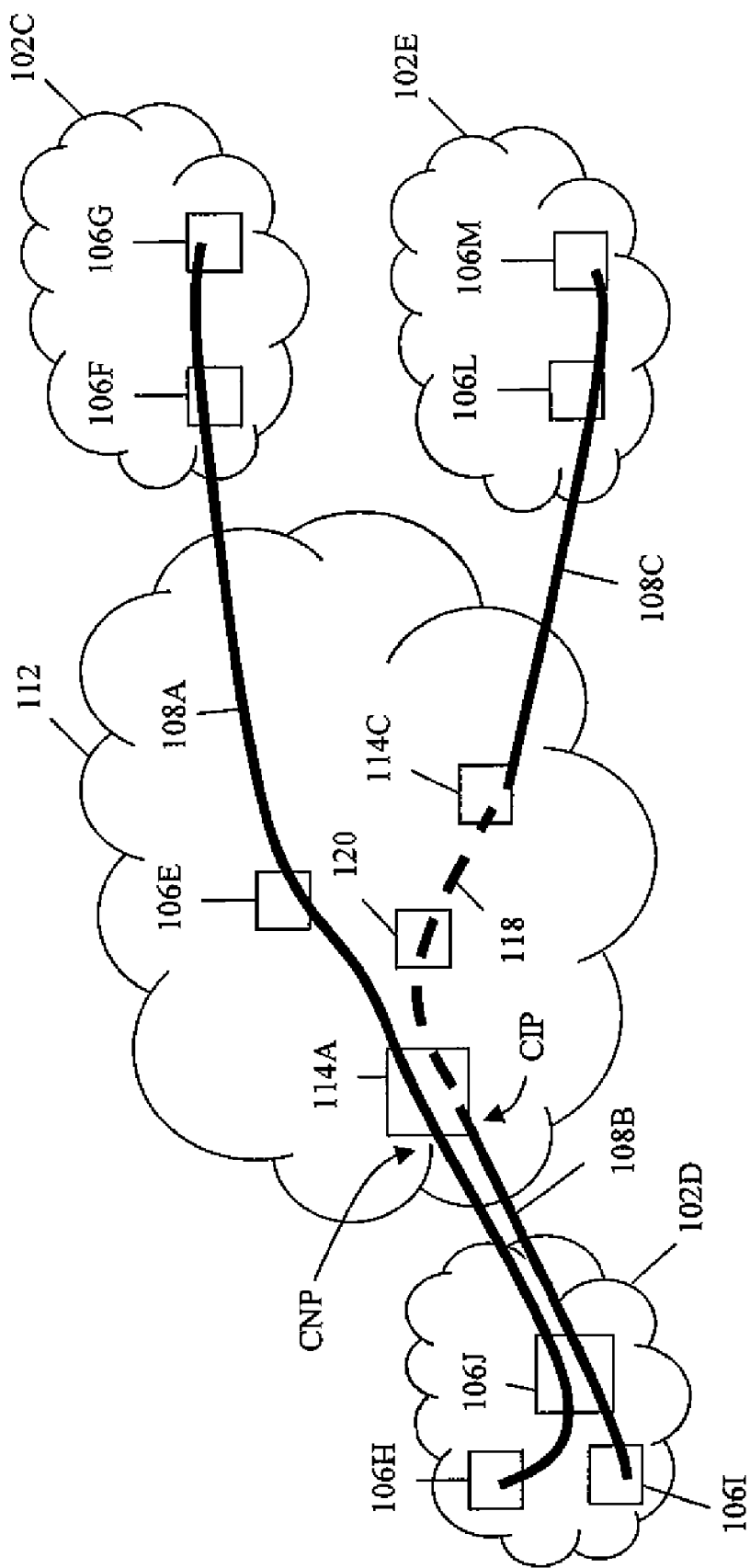
FIG. 6 is a schematic diagram of an embodiment of a customer network port in parallel with a customer instance port.
Figure 7:
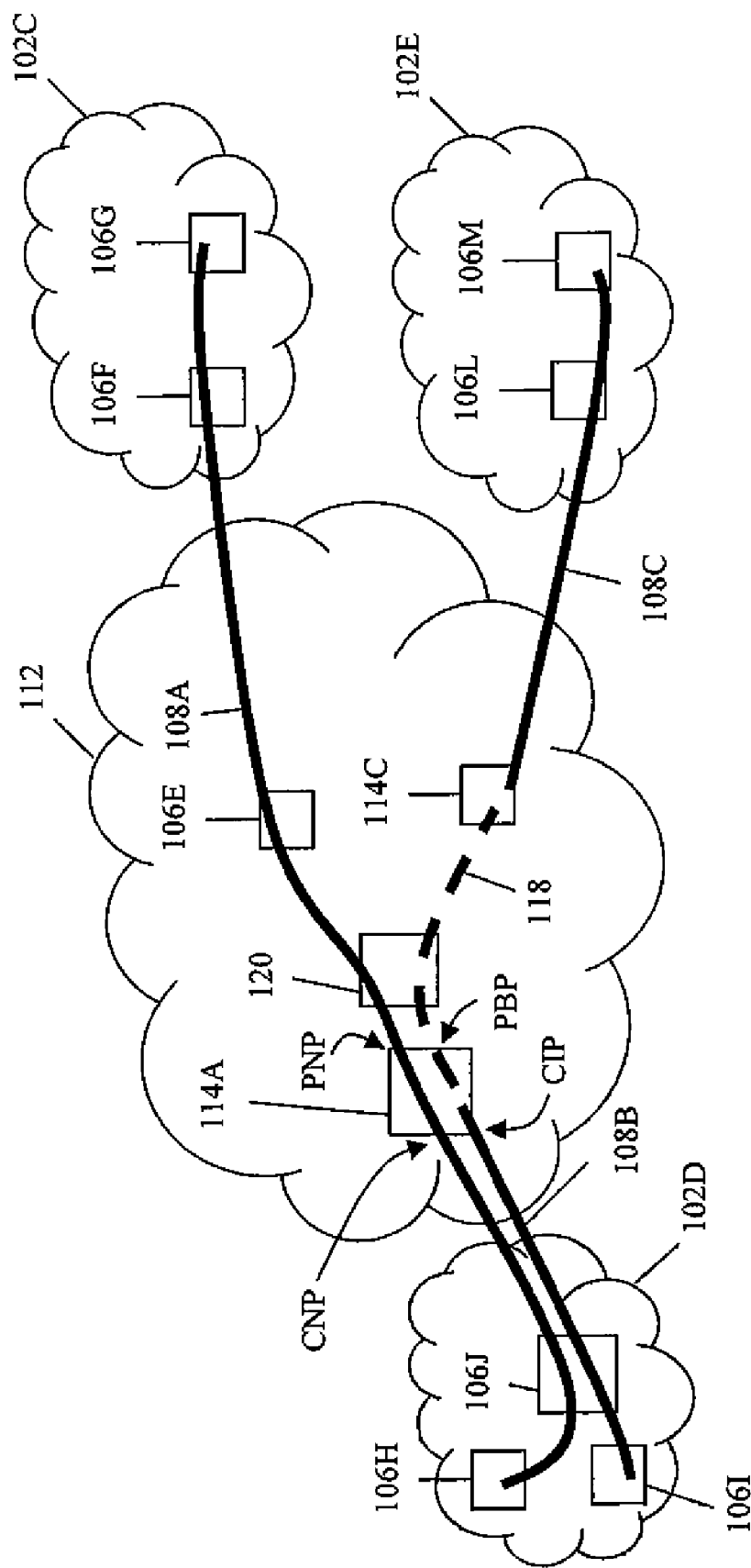
FIG. 7 is a schematic diagram of an embodiment of a combination of a provider network port in parallel with a provider backbone port and a customer network port in parallel with a customer instance port.

FIG. 6 illustrates another implementation of the OPB network having parallel ports. Similar to the earlier drafts of IEEE 802.1ah, drafts of IEEE 802.1ah prior to D7.0 (Aug. 15, 2007) are specified in such a way that a significant inefficiency exists when deploying the OPB. These drafts specified that S-tagged 108A traffic carried between PB 106J and PB 106E be transmitted or received at BEB 114A by a CNP if the traffic is not to be B-tagged. Alternatively, these drafts specified that S-tagged traffic carried between PB 106J and BCB 120 be transmitted or received at BEB 114A by a CIP if the traffic is to be backbone encapsulated. Thus, parallel ports may be required (each with a distinct VLAN identifier space) to communicate different types of traffic. As described above, the requirement for parallel ports, rather than a single port, creates additional product complexity, maintenance, and cost. FIG. 7 illustrates the occurrence of both types of parallel ports within a single OPB network.

Figure 8A:
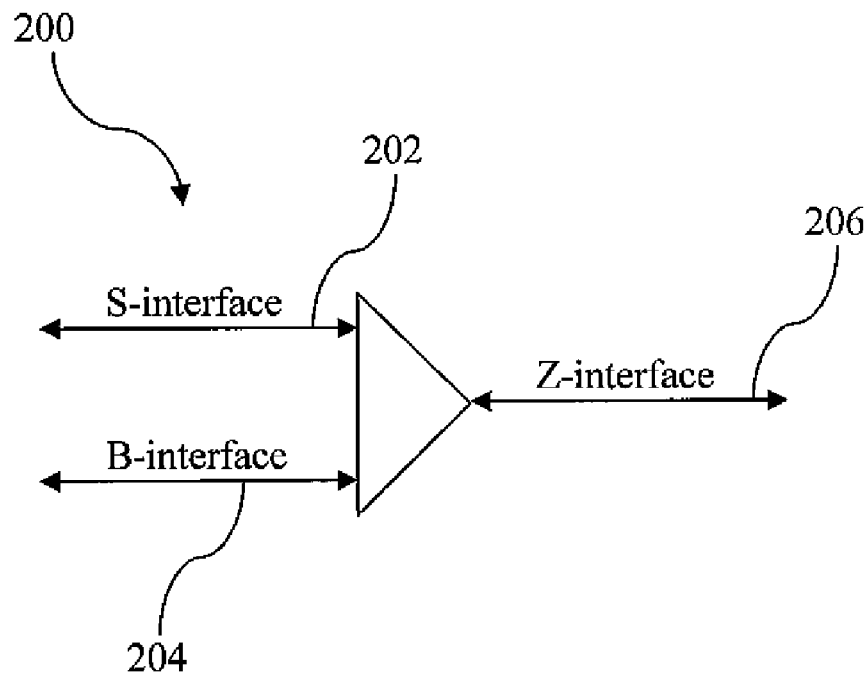
FIG. 8A is a schematic diagram of an embodiment of a backbone and non-backbone traffic multiplexer/demultiplexer.
Figure 8B:
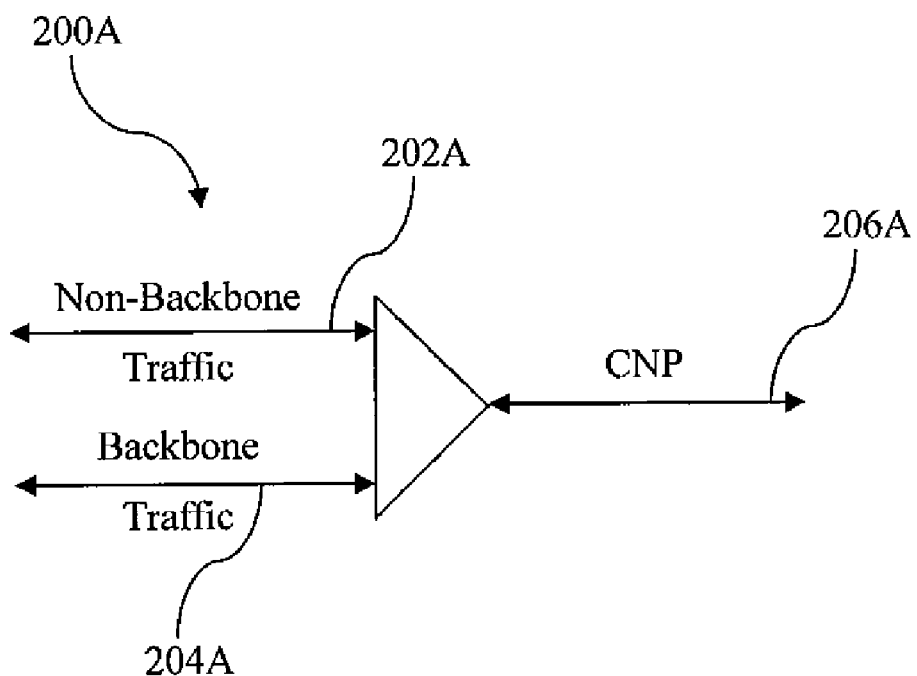
FIG. 8B is a schematic diagram of an embodiment of an I-component multiplexer/demultiplexer.
Figures 8C, 9:
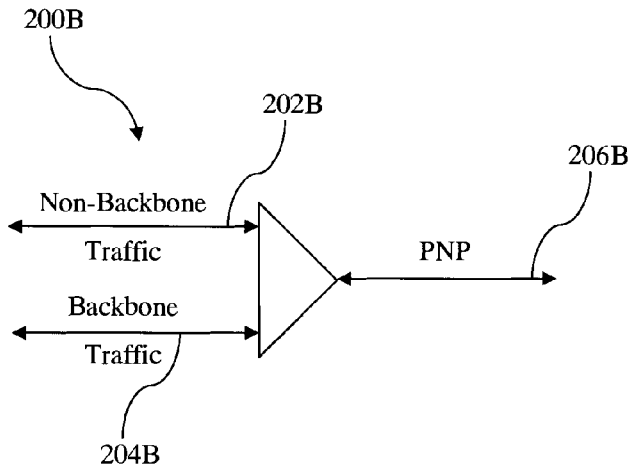
FIG. 8C is a schematic diagram of an embodiment of a B-component multiplexer/demultiplexer.
FIG. 9 is a schematic diagram of an embodiment of a frame format.

FIGS. 8A, 8B, and 8C illustrate three embodiments of components that may be installed in the nodes described herein to multiplex and demultiplex the backbone traffic and non-backbone traffic on a common port. FIG. 8A illustrates an embodiment of a general component 200 configured to multiplex and demultiplex the backbone traffic and non-backbone traffic on a common port. Generally, backbone traffic is associated with a B-Interface, while non-backbone traffic is associated with an S-interface. Thus, traffic on parallel S and B-interfaces may be multiplexed on a third type of interface, called a Z-Interface. As such, the component 200 comprises an S-interface 202 configured to carry non-backbone traffic, a B-interface 204 configured to carry backbone traffic, and a Z-interface 206 configured to carry multiplexed non-backbone and backbone traffic. In an embodiment, the Z-interface 206 may be a fiber pair, a logical link, or an aggregated link as defined by IEEE 802.3ag.

The component 200 acts as a multiplexer for traffic flowing from the left to the right in FIG. 8A, and as a demultiplexer for traffic flowing from right to left in FIG. 8A. For example, a first data stream comprising non-backbone traffic is received on the S-interface 202, and a second data stream comprising backbone traffic is received on the B-interface 204. In such a case, the component 200 transmits a third data stream multiplexing the first and second data streams from the Z-interface 206. In some operation modes or conditions, either the first data stream or the second data stream or both may contain no data and/or other information. Alternatively, the component 200 may operate similarly to demultiplex a fourth data stream from the Z-interface 206 into a fifth data stream comprising non-backbone traffic transmitted on the S-interface 202 and a sixth data stream comprising backbone traffic transmitted on the B-interface 204.

FIGS. 8B and 8C illustrate specific embodiments of the component 200, which may be applicable to the network migration issues described herein. Specifically, FIG. 8B illustrates an I-component 200A that may be used for CNPs, while FIG. 8C illustrates a B-component 200B that may be used for PNPs. In the I-component 200A, non-backbone traffic 202A and backbone traffic 204A are multiplexed by VID value, and transmitted on a CNP 206A. In the B-component 200B, non-backbone traffic 202B and backbone traffic 204B are multiplexed by VID value, and transmitted on a PNP 206B. In addition, B-component 200B or an adjacent component processing the backbone traffic 204B can add B-tags to backbone traffic 204B that will be transmitted on the PNP 206B, and remove B-tags from backbone traffic 204B that is received on the PNP 206B. Thus, the backbone traffic 204A in the I-component 200A is not currently B-tagged, but rather had its B-tag removed by an upstream B-component 200B or will have a B-tag added by a downstream B-component 200B.

When the component 200, the I-component 200A, or the B-component 200B is implemented in one of the nodes described above, the component 200, the I-component 200A, or the B-component 200B may multiplex or demultiplex the non-backbone and backbone traffic using any multiplexing method known to persons of ordinary skill in the art. For example, the component 200, the I-component 200A, or the B-component 200B may multiplex traffic on a first-in, first-out (FIFO) basis or give priority to either the backbone or the non-backbone traffic. The component 200, the I-component 200A, or the B-component 200B may also demultiplex traffic using the VID value in the traffic. Specifically, non-backbone and backbone traffic are assigned to distinct VID values. Each node can be provisioned with a table indicating which VIDs are associated with backbone traffic and which VIDs are associated with non-backbone traffic. As described below, the VID values assigned to each category should be consistent at each node. The non-backbone traffic and backbone traffic may then be demultiplexed using the VIDs in the table. The node may also buffer frames as needed to perform the multiplexing and demultiplexing.

FIG. 9 is an example of a frame 208 that has been B-tagged. Specifically, FIG. 9 illustrates an IEEE 802.1ah Ethernet frame that may comprise the following fields: a destination address 220, a source address 222, a tag protocol identifier (TPID) 224, a backbone VID (B-VID) 226, other header data 228, a length/type 210, a payload 212, and a frame check sequence 214. Briefly, the destination address 220 may indicate the destination node, and the source address 222 may indicate the backbone source node. Persons of ordinary skill in the art will appreciate that the destination address and source address may refer to Media Access Control (MAC) addresses, including Backbone MAC (B-MAC) addresses. The other header data 228 may include various other header information known to persons of ordinary skill in the art including an S-tag, the length/type 210 indicates the length or type of payload, the payload 212 is the data that the frame is carrying, and the frame check sequence 214 is used to verify the integrity of the frame. The frame 208 may also include a preamble that identifies the start of the frame.

The TPID 224 may be used to identify the forwarding type associated with the frame, and the B-VID 226 may be used to identify the VID associated with the frame. In an embodiment, the TPID 224 or B-VID 226 may be used to distinguish between traffic types, e.g. PBN traffic (bridged), PBBN traffic (backbone bridged), and PBB-TE (switched). Specifically, PBN is non-backbone traffic, PBBN and PBB-TE are backbone traffic. For example, the value "88A8" in the TPID 224 field may indicate that the VID identified in the B-VID 226 field identifies a bridged VID. Similarly, other values such as "8100" or any other assigned value may indicate that the VID identified in the B-VID 226 field identifies a switched VID. If other forwarding types exist within the network, then the TPID 224 and the VID 226 fields may be used to associate the frames with those forwarding types. Persons of ordinary skill in the art are aware of other entries that can be used to associate one of the TPID 224 fields with the various forwarding types.

In an embodiment, a VID Table may be used to map a plurality of B-VID 226 values to predetermined traffic types. A portion of an exemplary VID Table is shown below, where PBBN corresponds to PBBN Ethernet traffic, PBN corresponds to PBN Ethernet traffic, and PBB-TE corresponds to switched traffic. The VID Table may be employed to promote prevention and/or detection of misprovisioning in the node or a plurality of adjacent nodes, which cause inconsistencies in VID assignments to traffic, similarly to the method for preventing/detecting inconsistencies in VID assignments described in U.S. patent application Ser. No. 11/691,556 filed Mar. 27, 2007, by Sultan et al., entitled "Method of Preventing Transport Leaks in Hybrid Switching Networks," which is incorporated by reference.

TABLE 1

Portion of exemplary VID Table.

| B-VID | Type |
|---|---|
| 4095 | (unassigned) |
| 4094 | PBB-TE |
| 2020 | PBN |
| 2019 | PBB-TE |
| 2018 | PBN |
| 2017 | PBBN |
| 2016 | PBN |
| 5 | PBBN |
| 4 | PBN |
| 3 | PBN |
| 2 | PBB-TE |
| 1 | PBN |

Figure 10:
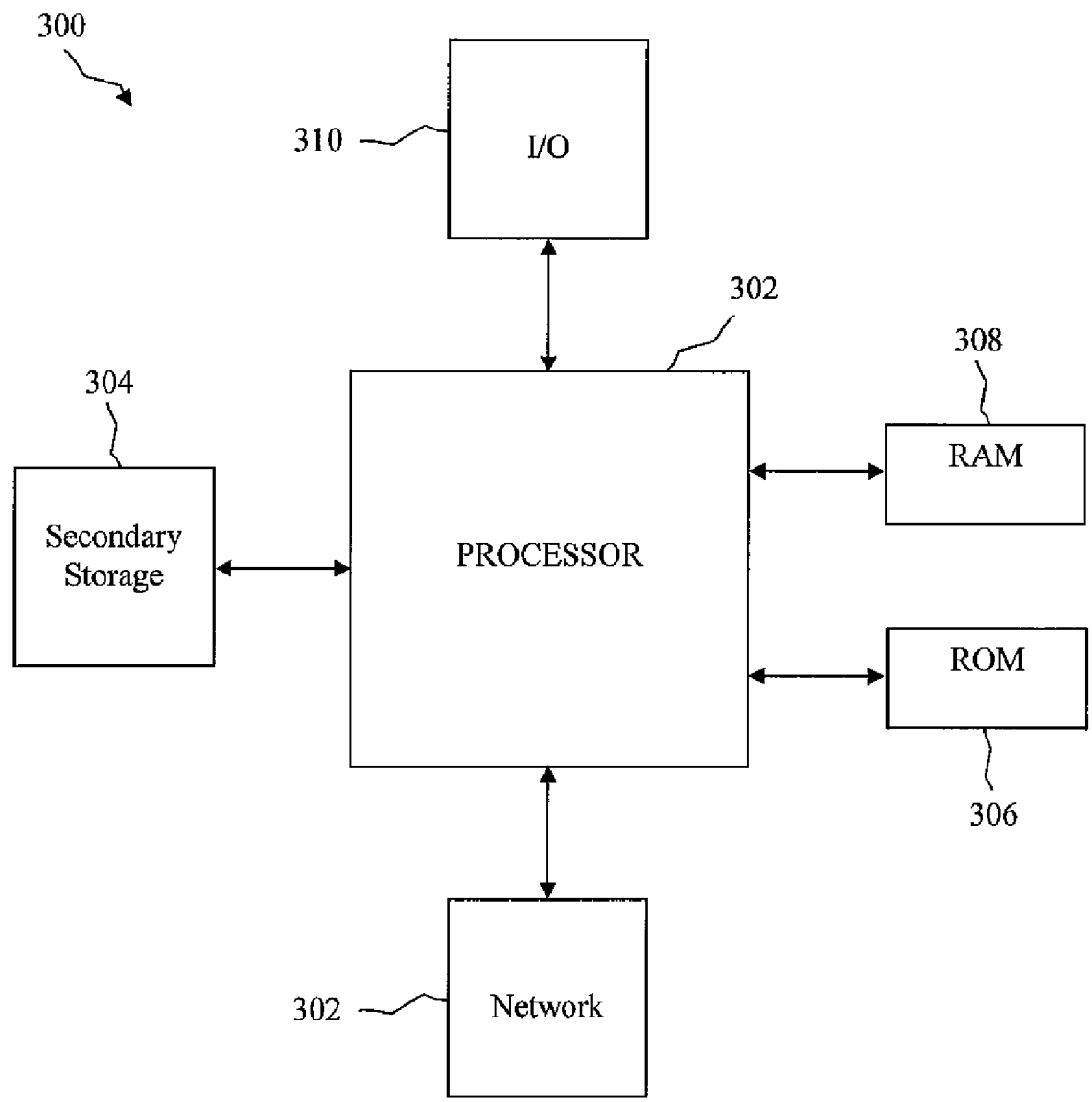
FIG. 10 is a schematic diagram of an embodiment of a general-purpose computer system.

The network described above may be implemented on any general-purpose network component, such as a computer, router, switch, or bridge, with sufficient processing power, memory resources, and network throughput capability to handle the necessary workload placed upon it. FIG. 10 illustrates a typical, general-purpose network component suitable for implementing one or more embodiments of a node disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) 310 devices, and network connectivity devices 312. The processor may be implemented as one or more CPU chips, or as one or more application specific integrated circuits (ASICs).

The secondary storage 304 is typically comprised of one or more disk drives or tape drives and is used for non-volatile storage of data and as an over-flow data storage device if RAM 308 is not large enough to hold all working data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage. The RAM 308 is used to store volatile data and perhaps to store instructions. Access to both ROM 306 and RAM 308 is typically faster than to secondary storage 304.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first interface configured to transmit or receive backbone traffic via a first link, wherein the first interface is configured to remove a B-tag from the backbone traffic before the backbone traffic is transmitted over the first link or add a B-tag to the backbone traffic after the backbone traffic is received over the first link;
a second interface configured to transmit or receive non-backbone traffic via a second link not aggregated with the first link, wherein the second interface neither removes a tag from the non-backbone traffic before the non-backbone traffic is transmitted over the second link nor adds a tag to the non-backbone traffic after the non-backbone traffic is received over the second link; and
a third interface in communication with the first interface and the second interface, the third interface configured to multiplex or demultiplex the backbone traffic and the non-backbone traffic via a third link,
wherein the backbone traffic is traffic that will be, is, or has been B-tagged.

2. The apparatus of claim 1, wherein the apparatus is a backbone edge bridge (BEB).

3. The apparatus of claim 2, wherein the third interface is associated with a customer network port (CNP), and wherein the BEB does not comprise a customer instance port (CIP).

4. The apparatus of claim 2, wherein the third interface is associated with a provider network port (PNP), and wherein the BEB does not comprise a provider backbone port (PBP).

5. The apparatus of claim 1, wherein the backbone traffic comprises a first Virtual Local Area Network Identifier (VID) and the non-backbone traffic comprises a second VID, wherein the backbone traffic is distinguished from the non-backbone traffic based on the first VID and the second VID.

6. The apparatus of claim 1 further comprising: a table comprising a plurality of Virtual Local Area Network Identifiers (VIDs) and a traffic type associated with each VID.

7. The apparatus of claim 1, wherein the first interface is associated with an IEEE 802.1ah port, the second interface is associated with a first IEEE 802.1ad port, and the third interface is associated with a second IEEE 802.1ad port.

8. The apparatus of claim 1,
wherein the non-backbone traffic comprises a first service data that is not encapsulated with a backbone header and that is associated with a Service Virtual Area Network (SVLAN),
wherein the backbone traffic comprises a second service data that is encapsulated with the backbone header,
wherein the non-backbone traffic and the backbone traffic are carried across a backbone network, and
wherein at least one backbone Virtual Local Area Network (BVLAN) is allocated to the SVLAN associated with the non-backbone traffic.

9. The apparatus of claim 1, wherein the third interface is configured to transmit multiplexed backbone and non-backbone traffic on a provider network port (PNP), wherein the B-tags are added to backbone traffic that will be transmitted on the PNP, and wherein the B-tags are removed from the backbone traffic that is received on the PNP.

10. The apparatus of claim 1, wherein the third interface is configured to transmit multiplexed backbone and non-backbone traffic on a customer network port (CNP).

11. A node comprising:
a processor configured to:
receive a first data stream comprising backbone traffic via a first link;
receive a second data stream comprising non-backbone traffic via a second link that is not aggregated with the first link;
add a B-tag to the backbone traffic, wherein no tag is added to the non-backbone traffic; and
multiplex the first data stream with the second data stream in a third data stream that is not transmitted over an aggregated link.

12. The node of claim 11, wherein the backbone traffic comprises a first S-tag prior to being received at the node, and the non-backbone traffic comprises a second S-tag prior to being received at the node.

13. The node of claim 11, wherein the processor is further configured to:
receive a fourth data stream comprising backbone traffic and non-backbone traffic; and
demultiplex the fourth data stream into a fifth data stream comprising backbone traffic and a sixth data stream comprising non-backbone traffic.

14. The node of claim 13, wherein the processor is further configured to: remove a B-tag from the backbone traffic in the fifth data stream, wherein no tag is removed from the non-backbone traffic in the sixth data stream.

15. The node of claim 13, wherein the processor is further configured to transmit the third data stream on a provider network port and receive the fourth data stream on a customer network port.

16. The node of claim 13, wherein the fourth data stream is demultiplexed based on a plurality of Virtual Local Area Network Identifiers (VIDs) in the backbone traffic and the non-backbone traffic.

17. The node of claim 16, wherein the processor is further configured to access a table to determine the VIDs associated with backbone traffic and the VIDs associated with non-backbone traffic.

18. The node of claim 17, wherein the table is used to detect or prevent misprovisioning within the node or a plurality of adjacent nodes.

19. The node of claim 11,
wherein the non-backbone traffic comprises a first service data that is not encapsulated with a backbone header and that is associated with a Service Virtual Area Network (SVLAN),
wherein the backbone traffic comprises a second service data that is encapsulated with the backbone header,
wherein the non-backbone traffic and the backbone traffic are carried across a backbone network, and
wherein at least one backbone Virtual Local Area Network (BVLAN) is allocated to the SVLAN associated with the non-backbone traffic.

20. A method comprising:
transmitting a plurality of frames over a provider backbone bridged network (PBBN) that comprises a PBBN Virtual Local Area Networks (VLAN) space,
wherein frames containing encapsulated service data are carried within Backbone VLANs (B-VLANs) that are created over the PBBN,
wherein unencapsulated Service VLAN (S-VLAN) traffic is carried over the PBBN by allocating some of the PBBN VLAN space to S-VLANs,
wherein a B-VLAN determines the route that its frames will take and limits broadcasting within the PBBN,
wherein a B-tag is added to each frame, and
wherein the selection of the B-VLAN that is used to form the B-Tag is determined by a table that maps intermediate service identifiers (I-SIDs) to backbone virtual identifiers (B-VIDs).

* * * * *